United States Patent
Wu et al.

(10) Patent No.: US 7,015,987 B2
(45) Date of Patent: Mar. 21, 2006

(54) LIQUID CRYSTAL DISPLAY MODULE

(75) Inventors: Chih-Kang Wu, Taoyuan (TW);
Hui-Kai Chou, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 24 days.

(21) Appl. No.: 10/709,007

(22) Filed: Apr. 7, 2004

(65) Prior Publication Data

US 2004/0223092 A1 Nov. 11, 2004

(30) Foreign Application Priority Data

May 6, 2003 (TW) .............................. 92112283 A

(51) Int. Cl.
*G02F 1/1333* (2006.01)

(52) U.S. Cl. ...................................... 349/58
(58) Field of Classification Search ............... 349/64, 349/58
See application file for complete search history.

(56) References Cited

U.S. PATENT DOCUMENTS

| | | | |
|---|---|---|---|
| 6,491,411 B1 * | 12/2002 | Itoh | 362/246 |
| 6,891,580 B1 * | 5/2005 | Jang et al. | 349/58 |
| 2002/0030993 A1 * | 3/2002 | Itoh | 362/246 |
| 2003/0223249 A1 * | 12/2003 | Lee et al. | 362/561 |
| 2004/0114372 A1 * | 6/2004 | Han et al. | 362/330 |
| 2004/0227870 A1 * | 11/2004 | Jang | 349/64 |
| 2005/0030443 A1 * | 2/2005 | Nagahama | 349/64 |
| 2005/0073626 A1 * | 4/2005 | Yeom | 349/64 |

* cited by examiner

*Primary Examiner*—James A. Dudek
(74) *Attorney, Agent, or Firm*—Jianq Chyun IP Office

(57) ABSTRACT

A liquid crystal display module comprising a first bezel module and a second bezel module is provided. The first bezel module furthermore comprises a lower bezel, a diffusion plate, an optical film plate, a liquid crystal panel and an upper bezel. The diffusion plate is positioned over the lower bezel and the optical film plate is positioned over the diffusion plate. The liquid crystal panel is positioned over the optical film plate. The upper bezel is positioned over the lower bezel such that the lower bezel and the upper bezel together fix the diffusion plate, the optical film plate and the liquid crystal panel. The second bezel module furthermore comprises a bottom bezel, a reflecting plate and a light source. The reflecting plate is positioned over the bottom bezel and the light source is embedded within the bottom bezel above the reflecting plate. The first bezel module and the second bezel module are assembled together by a detachable means.

16 Claims, 4 Drawing Sheets

LIQUID CRYSTAL DISPLAY MODULE

CROSS REFERENCE TO RELATED APPLICATIONS

This application claims the priority benefit of Taiwan application serial no. 92112283, filed May 06, 2003.

BACKGROUND OF INVENTION

1. Field of Invention

The present invention relates to a liquid crystal display. More particularly, the present invention relates to a liquid crystal display module having two independent bezel modules for rapid replacement of light source elements.

2. Description of Related Art

To match the life style of modern people, video or imaging equipment is becoming lighter and slimmer. Although the conventional cathode ray tube (CRT) display has many advantages, the design of the electron gun renders it heavy and bulky. Moreover, there is always some danger of hurting viewer"s eyes due to the production of a small amount of radiation. With big leaps in the techniques in manufacturing semiconductor devices and electro-optics devices, flat panel displays such as liquid crystal displays (LCD), organic light-emitting displays (OLED) and plasma display panel (PDP) have gradually become the mainstream display products.

According to the light source, a liquid crystal display can be classified as belonging to one of three types: the reflection LCD, the transmissive LCD and the transflective LCD. Using a transmission or a transflective LCD as an example, the LCD mainly comprises a liquid crystal panel and a back light module. The liquid crystal panel furthermore comprises a liquid crystal layer sandwiched between two transparent substrates. The back light module provides a surface light source to illuminate the liquid crystal panel for displaying images.

FIG. 1 is a perspective view showing all the components of a conventional liquid crystal display module for using a straight down back light module. As shown in FIG. 1, the liquid crystal display 100 mainly comprises a back bezel 102, a reflecting plate 104, a light source 106, a diffusion plate 108, an optical film plate 110, a frame 112, a liquid crystal panel 114 and a front bezel 116. The reflecting plate 104 is set up on the inner bottom surface of the back bezel 102. The light source 106 is set up inside the back bezel 102 above the reflecting plate 104. The diffusion plate 108 and the optical film plate 110 are sequentially stacked above the back bezel 102 and fixed in position by the frame 112. The liquid crystal panel 114 is set up over the frame 112. The front bezel 116 is set up above the back bezel 102 such that the front bezel 116 and the back bezel 102 together station the liquid crystal panel 114.

In the aforementioned liquid crystal display 100, the assembling sequence includes providing the back bezel 102 and then positioning the reflection plate 104, the light source 106, the diffusion plate 108, the optical film plate 110, the frame 112, the liquid crystal panel 114 and the front bezel 116 over the back bezel 102 sequentially.

However, the front bezel 116, the frame 112 and the back bezel 102 surround the light source 106 as shown in FIG. 1. To replace the light source 106, the front bezel 116, the liquid crystal panel 114, the frame 112, the optical film plate 110 and the diffusion plate 108 must be dismantled sequentially. After the replacement, the above components must be assembled in a reverse order. Therefore, the process of replacing a light source is cumbersome and time consuming. Moreover, one may accidentally damage or contaminate some of the components during the dismantling and the assembling process.

SUMMARY OF INVENTION

Accordingly, one object of the present invention is to provide a liquid crystal display module having a light source that can be replaced without dismantling all the components constituting the module.

Another object of this invention is to provide a liquid crystal display module capable of minimizing the amount of damages or contamination to components constituting the module resulting from dismantling the components to replace a light source within the module.

To achieve these and other advantages and in accordance with the purpose of the invention, as embodied and broadly described herein, the invention provides a liquid crystal display module. The liquid crystal display module comprises a first bezel module and a second bezel module. The first bezel module furthermore comprises a lower bezel, a diffusion plate, an optical film plate, a liquid crystal panel and an upper bezel. The diffusion plate is positioned over the lower bezel and the optical film plate is positioned over the diffusion plate. The liquid crystal panel is positioned over the optical film plate. The upper bezel is positioned over the lower bezel such that the lower bezel and the upper bezel together fix the diffusion plate, the optical film plate and the liquid crystal panel. The second bezel module furthermore comprises a bottom bezel, a reflecting plate and a light source. The reflecting plate is positioned over the bottom bezel and the light source is embedded within the bottom bezel above the reflecting plate. The first bezel module and the second bezel module are assembled together through a detachable means.

In the aforementioned liquid crystal display module, the reflection plate can be deleted if the bottom bezel is fabricated using a reflecting material.

Since the liquid crystal display module is produced through an assembling of the independently built first bezel module and second bezel module, the light source can be replaced immediately after detaching one of the bezel modules from the other. In short, the process of replacing the light source inside the display module is much simplified and hence a considerable time is saved.

Furthermore, limiting the number of components to be dismantled before replacing the light source greatly reduces the possibility of any damage or contamination to the components constituting the liquid crystal display module.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
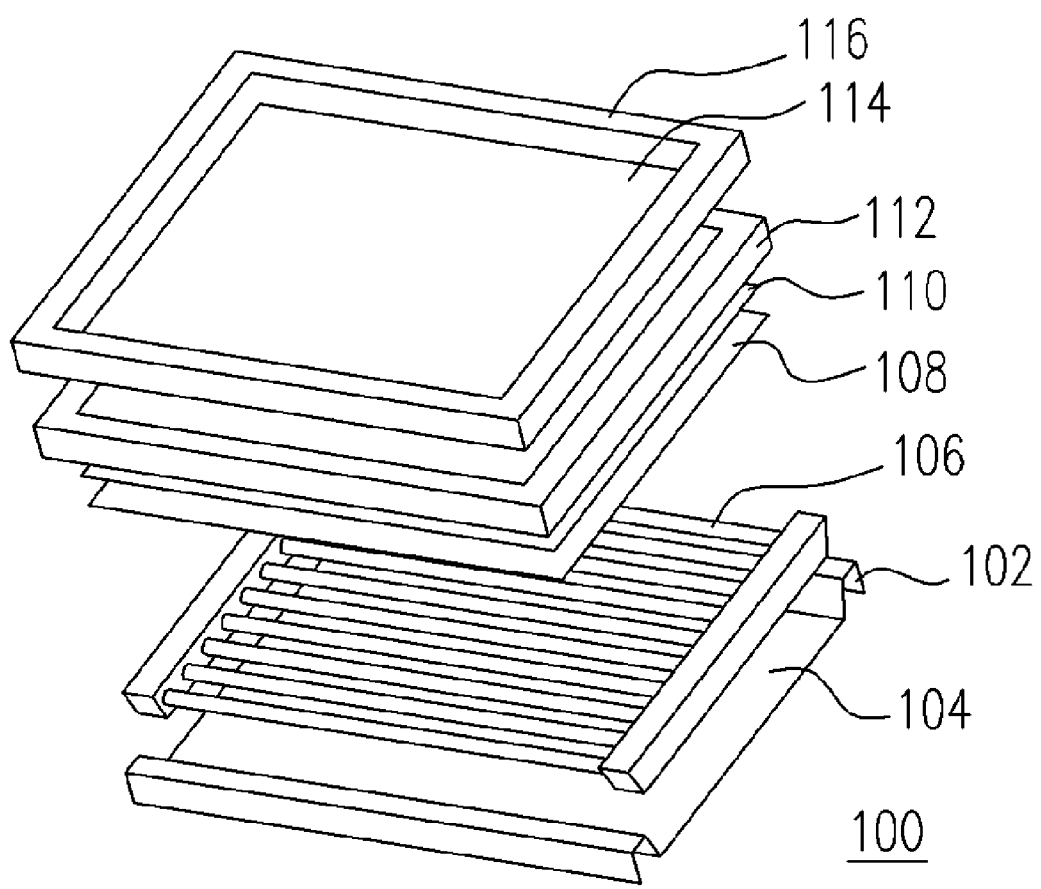
FIG. 1 is a perspective view showing all the components of a conventional liquid crystal display module for using a straight down back light module.

Reference will now be made in detail to the present preferred embodiments of the invention, examples of which are illustrated in the accompanying drawings. Wherever possible, the same reference numbers are used in the drawings and the description to refer to the same or like parts.

Figure 2:
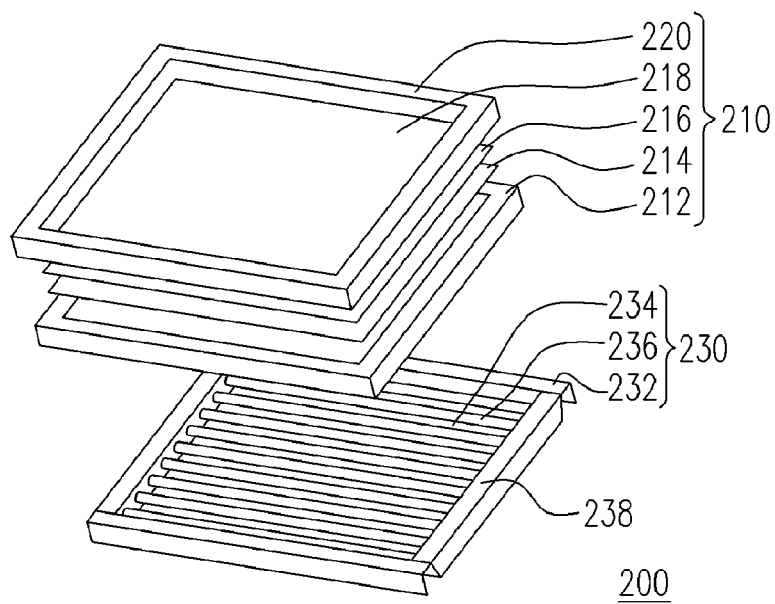
FIG. 2 is a perspective view showing all the components of a liquid crystal display module according to one preferred embodiment of this invention.
Figure 3:
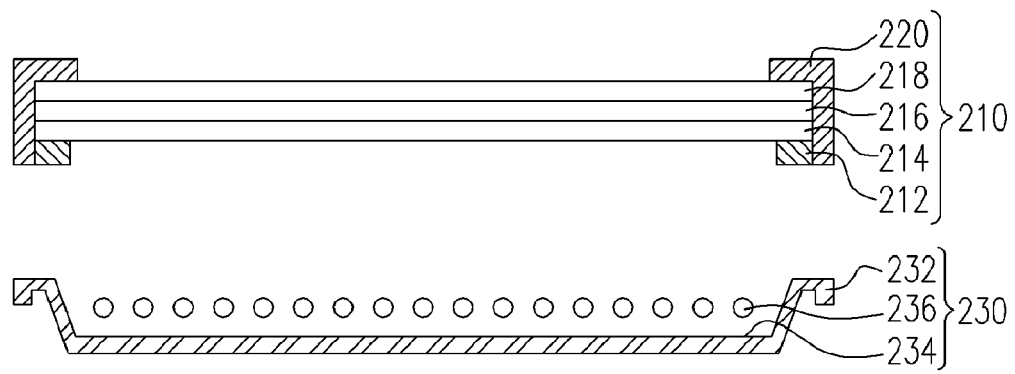
FIG. 3 is a schematic cross-sectional view of a liquid crystal display module according to one preferred embodiment of this invention.

FIG. 2 is a perspective view showing all the components of a liquid crystal display module according to one preferred embodiment of this invention. FIG. 3 is a schematic cross-sectional view of a liquid crystal display module according to one preferred embodiment of this invention. As shown in FIGS. 2 and 3, the liquid crystal display module 200 according to this invention is produced through a process of assembling a first bezel module 210 and a second bezel module 230 together.

The first bezel module 210 furthermore comprises a lower bezel 212, a diffusion plate 214, an optical film plate 216, a liquid crystal panel 218 and an upper bezel 220. The diffusion plate 214 is set up over the lower bezel 212 and the optical film plate 216 is set up over the diffusion plate 214. The optical film plate 216 is a light-enhance plate or a prism plate, for example. The liquid crystal panel 218 is set up over the optical film plate 216. The upper bezel 220 is positioned over the lower bezel 212 such that the upper bezel 220 and the lower bezel 212 fix the diffusion plate 214, the optical film plate 216 and the liquid crystal panel 218 together to form the first bezel module 210.

The second bezel module 230 comprises a bottom bezel 232, a reflecting plate 234 and a light source 236. The reflecting plate 234 is set up on the bottom surface of the bottom bezel 232 for reflecting any light not heading straight towards to the display panel (not shown) so that the light from the light source 236 is optimally utilized. The light source 236 is set up inside a groove formed by the bottom bezel 232. The light source 236 is a cold cathode fluorescent lamp that emits white light, for example. The light source 236 is fixed on the bottom surface of the bottom bezel 232 through a light source holder 238, for example.

The first bezel module 210 and the second bezel module 230 are assembled together to form a liquid crystal display module 200 through a detachable means. To replace the light source 236 within the liquid crystal display module 200, the first bezel module 210 is detached from the second bezel module 230 to expose the light source 236 within the second bezel module 230. After replacing the light source 236, the first bezel module 210 and the second bezel module 230 are reassembled together. Unlike the conventional design, there is no need to dismantle the bezel, the liquid crystal panel, the frame, the optical film plate and the diffusion plate before replacing the light source. Thus, the design of this invention is able to simplify the replacement process of the light source and shorten the replacement time considerably.

Figure 4:
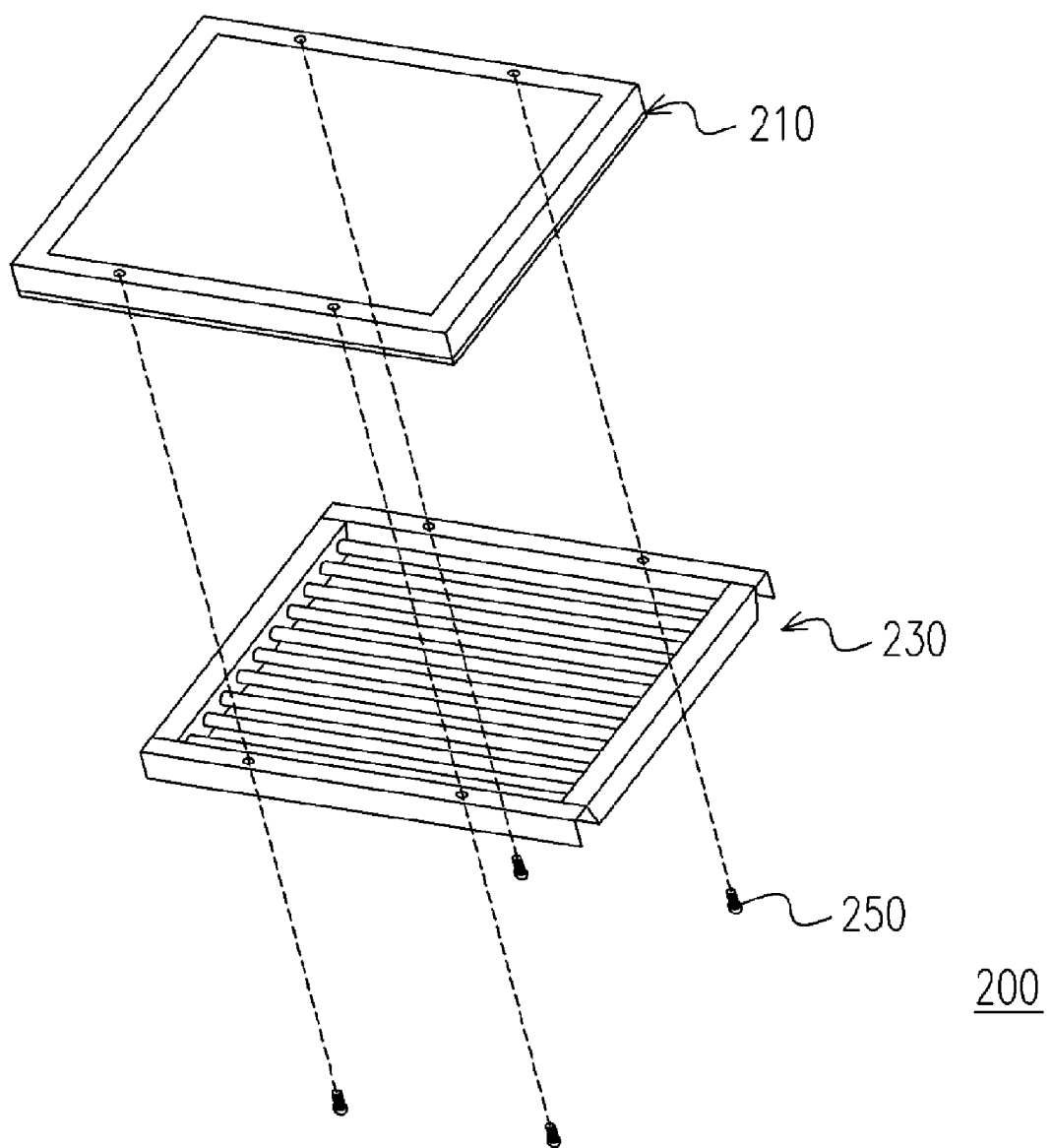
FIG. 4 is a perspective view showing one mode of assembling the components of a liquid crystal display module according to one preferred embodiment of this invention.

The first bezel module 210 and the second bezel module 230 in the liquid crystal display module 200 can be assembled in several ways. FIG. 4 is a perspective view showing a first mode of assembling the components of a liquid crystal display module according to one preferred embodiment of this invention. As shown in FIG. 4, the first bezel module 210 and the second bezel module 230 may be fastened together using some locking elements such as a set of screws 250. The light source 236 can be replaced after the screws 250 locking the first bezel module 210 to the second bezel module 230 together are unscrewed.

Figure 5:
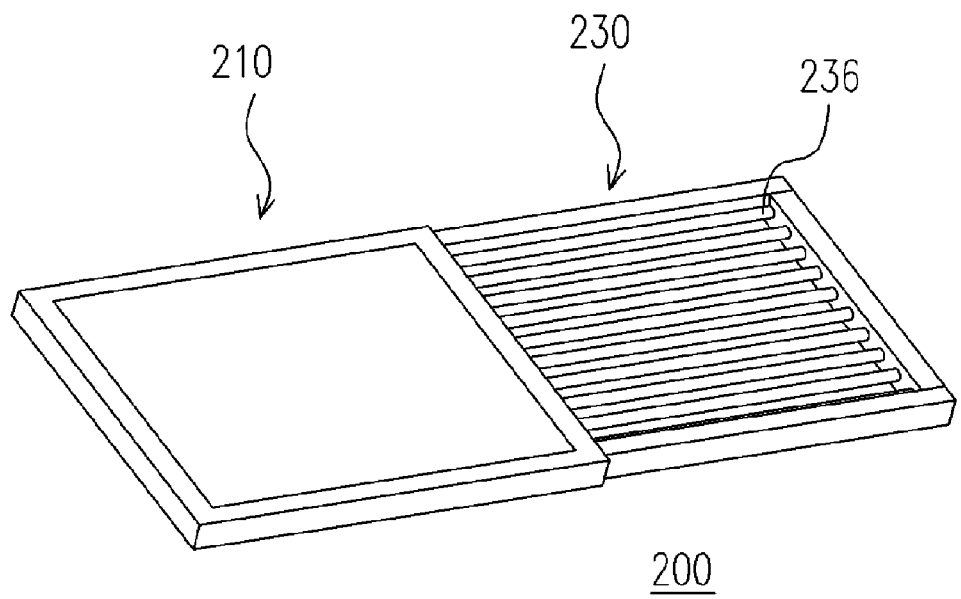
FIG. 5 is a perspective view showing another mode of assembling the components of a liquid crystal display module according to one preferred embodiment of this invention.

FIG. 5 is a perspective view showing another mode of assembling the components of a liquid crystal display module according to one preferred embodiment of this invention. As shown in FIG. 5, the first bezel module 210 and the second bezel module are designed as a set of drawer. For example, the first bezel module 210 is designed to have an interior space big enough to accommodate the second bezel module 230. Furthermore, a set of sliding grooves (not shown) is set up at a suitable location within the interior sidewalls so that the second bezel module 230 can easily slide into or slide out of the first bezel module 210 enclosure. In general, the second bezel module 230 is slide into the interior space of the first bezel module and fastened using a fastener. When the light source 236 needs to be replaced, the fastener between first bezel module 210 and the second bezel module 230 are disengaged and then the second bezel module 230 can be pulled out guided by the sliding grooves.

Figure 6:
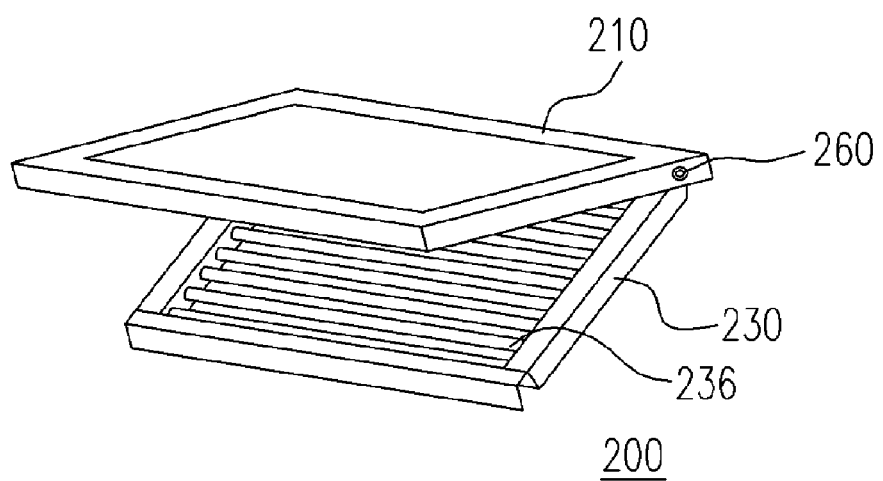
FIG. 6 is a perspective view showing yet another mode of assembling the components of a liquid crystal display module according to one preferred embodiment of this invention.

FIG. 6 is a perspective view showing yet another mode of assembling the components of a liquid crystal display module according to one preferred embodiment of this invention. As shown in FIG. 6, the first bezel module 210 and the second bezel module 230 together form a flip-top design. For example, the first bezel module 210 and the second bezel module 230 are pivoted together near one end of the second bezel module 230 through a hinge 260 so that the first bezel module 210 can flip open or close relative to the second bezel module 230. In general, the first bezel module 210 is flipped over the second bezel module 230 and locked together through a fastener (not shown). To replace the light source 236, the fastener locking the first bezel module 210 to the second bezel module 230 is disengaged and then the first bezel module 210 is lifted up. In other words, the first bezel module 210 turns relative to the hinge 260 to expose the light source 236 within the second bezel module 230 so that the light source 236 can be replaced.

In the aforementioned embodiment, the bottom surface of the bottom bezel in the second bezel module has a reflecting plate. However, the bottom bezel 232 as shown in FIGS. 2 and 3 may be fabricated using a light-reflecting material so that the bottom surface 234 is reflective. Thus, there is no need to install a reflecting plate to deflect the light from the light source.

Furthermore, the liquid crystal display module can be applied not only to an active matrix liquid crystal display, but can be applied to a passive matrix liquid crystal display as well.

In summary, the liquid crystal display module of this invention has at least the following advantages: 1. The liquid crystal display module is an assembly of two detachable parts, namely, the first bezel module and the second bezel module. Hence, the light source can be replaced quickly after separating the first bezel module from the second bezel module. 2. Because the light source can be replaced without dismantling the components of the module, any damage or contamination to the components during the replacement process is greatly minimized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display module, comprising:
   a first bezel module, having:
   a lower bezel;
   a diffusion plate set up over the lower bezel;
   an optical film plate set up over the diffusion plate;
   a liquid crystal panel set up over the optical film plate;
   and an upper bezel above the lower bezel such that the lower bezel and the upper bezel together fix the diffusion plate, the optical film plate and the liquid crystal panel;
   a second bezel module, having:
   a bottom bezel; a reflecting plate set up on the bottom surface of the bottom bezel; and
   a light source positioned within the bottom bezel above the reflecting plate,
   wherein the first bezel module is assembled with the second bezel module in a detachable way.

2. The liquid crystal display module of claim 1, wherein the first bezel module is fastened to the second bezel module through some locking elements.

3. The liquid crystal display module of claim 1, wherein the first bezel module has an interior space for accommodating the second bezel module.

4. The liquid crystal display module of claim 3, wherein the interior sidewalls of the interior space of the first bezel module have a sliding groove and the second bezel module engages with the first bezel module through the sliding grooves.

5. The liquid crystal display module of claim 1, wherein the first bezel module engages with the second bezel module through a hinge located on one side of the bezel modules.

6. The liquid crystal display module of claim 1, wherein the optical film plate comprises light-enhance plate or prism plate.

7. The liquid crystal display module of claim 1, wherein the light source comprises a cold cathode fluorescent lamp (CCFL) light source.

8. The liquid crystal display module of claim 1, wherein the module furthermore comprises a light source holder set up within the bottom bezel for holding the light source element.

9. A liquid crystal display module, comprising:
   a first bezel module, having:
   a lower bezel;
   a diffusion plate set up over the lower bezel;
   an optical film plate set up over the diffusion plate;
   a liquid crystal panel set up over the optical film plate; and
   an upper bezel above the lower bezel such that the lower bezel and the upper bezel together fix the diffusion plate, the optical film plate and the liquid crystal panel;
   a second bezel module, having:
   a bottom bezel; wherein the bottom bezel is fabricated using a light-reflecting material; and
   a light source positioned within the bottom bezel,
   wherein the first bezel module is assembled with the second bezel module in a detachable way.

10. The liquid crystal display module of claim 9, wherein the first bezel module is fastened to the second bezel module through some locking elements.

11. The liquid crystal display module of claim 9, wherein the first bezel module has an interior space for accommodating the second bezel module.

12. The liquid crystal display module of claim 11, wherein the interior sidewalls of the interior space of the first bezel module have a sliding groove and the second bezel module engages with the first bezel module through the sliding grooves.

13. The liquid crystal display module of claim 9, wherein the first bezel module engages with the second bezel module through a hinge located on one side of the bezel modules.

14. The liquid crystal display module of claim 9, wherein the optical film plate comprises light-enhance plate or prism plate.

15. The liquid crystal display module of claim 9, wherein the light source comprises a cold cathode fluorescent lamp (CCFL) light source.

16. The liquid crystal display module of claim 9, wherein the module furthermore comprises a light source holder set up within the bottom bezel for holding the light source element.

* * * * *